US011526958B2

(12) United States Patent
Bhat et al.

(10) Patent No.: US 11,526,958 B2
(45) Date of Patent: Dec. 13, 2022

(54) REAL-TIME ANALYSIS OF BULK MATERIAL ACTIVITY

(71) Applicant: Halliburton Energy Services, Inc., Houston, TX (US)

(72) Inventors: Sumit Bhat, The Woodlands, TX (US); Stanley V. Stephenson, Duncan, OK (US); Oscar Andres Cabada Kriebel, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 486 days.

(21) Appl. No.: 16/453,768

(22) Filed: Jun. 26, 2019

(65) Prior Publication Data

US 2020/0410622 A1    Dec. 31, 2020

(51) Int. Cl.
*G06Q 30/00* (2012.01)
*G06Q 50/30* (2012.01)
*G06N 20/00* (2019.01)
*G06Q 10/08* (2012.01)

(52) U.S. Cl.
CPC ............. *G06Q 50/30* (2013.01); *G06N 20/00* (2019.01); *G06Q 10/087* (2013.01); *G06Q 10/08355* (2013.01)

(58) Field of Classification Search
CPC ... G06Q 50/30; G06Q 10/08355; G06N 20/00
USPC ............................................................ 705/1
See application file for complete search history.

(56) References Cited

U.S. PATENT DOCUMENTS

| | | | |
|---|---|---|---|
| 6,339,745 B1 | 1/2002 | Novik | |
| 6,753,808 B2 | 6/2004 | Lee et al. | |
| 8,189,866 B1 | 5/2012 | Gu et al. | |
| 8,461,958 B2 | 6/2013 | Saenz et al. | |
| 9,607,342 B2 * | 3/2017 | Christie | G06Q 10/0875 |

(Continued)

FOREIGN PATENT DOCUMENTS

| | | |
|---|---|---|
| CN | 202650043 U | 1/2013 |
| WO | 2017044921 A1 | 3/2017 |

OTHER PUBLICATIONS

International Search Report and Written Opinion dated Jul. 22, 2020, International PCT Application No. PCT/US2020/026207.

*Primary Examiner* — Rokib Masud
(74) *Attorney, Agent, or Firm* — McGuireWoods LLP (57) ABSTRACT

Disclosed herein are methods and system for redistributing bulk material across a geographical area. A method for providing bulk material for a wellbore operation, the method comprising: forming a logistical model database to determine bulk material required for an at least one wellsite located in a geographical area; acquiring bulk material from a distribution center; verifying the bulk material acquired; and transporting bulk material for the wellbore operation. A method for providing bulk material for a wellbore operation, the method comprising: determining demand for bulk material across a geographical area; collecting data throughout a life cycle of bulk material; transmitting collected data to an off-site network comprising an adaptive machine; analyzing collected data via the off-site network thereby producing an output; providing bulk material to a wellsite based on output. A system comprising: bulk material transport; off-site network comprising an adaptive machine; sensor coupled to the bulk material transport.

20 Claims, 4 Drawing Sheets

(56) References Cited

U.S. PATENT DOCUMENTS

| | | |
|---|---|---|
| 2008/0123975 A1 | 5/2008 | Otsu |
| 2008/0130948 A1 | 6/2008 | Ozer |
| 2009/0048890 A1* | 2/2009 | Burgh .............. G06Q 10/06375 |
| | | 705/7.26 |
| 2014/0216736 A1 | 8/2014 | Leugemors et al. |
| 2014/0234059 A1* | 8/2014 | Thomeer .................. B60P 3/14 |
| | | 702/6 |
| 2019/0145239 A1 | 5/2019 | Yu et al. |
| 2019/0179983 A1 | 6/2019 | Prochnow et al. |

* cited by examiner

REAL-TIME ANALYSIS OF BULK MATERIAL ACTIVITY

BACKGROUND

Significant volumes of sand (118 MM tones in 2018) is mined and delivered to remote wellsite locations to support the US stimulation services market. The industry supply-chains that are required to support this are typically manual, paper driven and have very little by way of automation. The present disclosure, may be designed to leverage the recent containerization of sand and new and unique micro-location technologies along with machine learning algorithms, which may allow us for the optimization of the supply chain. The present disclosure may allow for the sand inventory to be located at any point during its life cycle, distribution center to the wellsite.

Maintaining security of supply at the well site is critical to efficient operations. The present disclosure may provide automated and real-time visibility to the sand-vessel, by location, sand-type and quantity. Knowing where the inventory may be in real time may enable for the system to rapidly match supply to demand. The present disclosure may also help redistribute bulk material to well-sites across a defined geographical area thereby reducing and/or preventing disruptions and/or oversupply at a well-site or a plurality of well-sites.

BRIEF DESCRIPTION OF THE DRAWINGS

These drawings illustrate certain aspects of some of the present disclosure, and should not be used to limit or define the disclosure.

DETAILED DESCRIPTION

In an embodiment, one or more Oil & Gas Well sites may be under consideration for exploration and/or production operations. A wellsite administrator may be evaluating the desirability of the well or preparing a logistical plan for well operations.

Next, the administrator may use a logistical model database to determine inventory needs for the wellsite under consideration. In certain embodiments, the logistical model may contain historical inventory data indexed by basin or area so that the engineer can look up nearby well-sites and review inventory data, such as what inventory was needed, how much was needed, and when it was needed. Additionally or alternatively, the logistical model may be indexed by wellsite properties (e.g., lithology, depth) so that the engineer may use known properties of the planned wellsite to review historical information from similar well-sites that may have comparable properties. In this way, the engineer may identify not only which inventory was used but may also anticipate which inventory items may be particularly well-suited to the anticipated wellsite environment.

The administrator may then estimate which bulk materials the wellsite will need and when they will be needed. The administrator may then develop a logistical plan for which inventory items should be ordered and when to schedule their delivery to the wellsite. This information may be programmed locally at a wellsite or in central planning and scheduling tool. This information may also be transmitted to an off-site network 106 where the data may be stored and processed. This selection may be made for each wellsite in a given geographical area. Once a logistical plan is in place, well-site operations may begin. The logistical plan developed may be presented and revised throughout the process operation. In an embodiment, changes made to the well-site operations may lead to disruptions or oversupply events at a given well-site, or multiple well-sites located in a defined geographical area. As used herein, "disruptions" refer to an event when well-site operations may be shut down due to an insufficient amount of bulk material required to perform said operation. As used herein, "oversupply" may refer to an event when bulk material may not be utilized at a well-site due to the surplus of said bulk material. The methods and systems disclosed herein may help mitigate disruptions and oversupply to a well-site. Additionally, the methods and systems disclosed herein may help redistribute bulk material to well-sites across a defined geographical area thereby reducing and/or preventing disruptions and/or oversupply at a well-site or a plurality of well-sites.

Bulk material may be used during wellsite operations. As used herein, "bulk material" may include liquids, solids, and/or gas, and is not limited to those utilized during wellsite and/or other oilfield operations. One or more aspects of the present disclosure may relate to implementations in which the bulk material may comprise sand, proppant, guar, water, combustion engine fuel, and/or other materials consumed in appreciable quantities at a wellsite, another oilfield location, and even other locations not associated with oil and gas operations. In an embodiment, bulk material may be transported from a distribution center and to a wellsite in any suitable manner. In an embodiment, bulk material may be transported by way of a bulk material transport 200.

Figure 1:
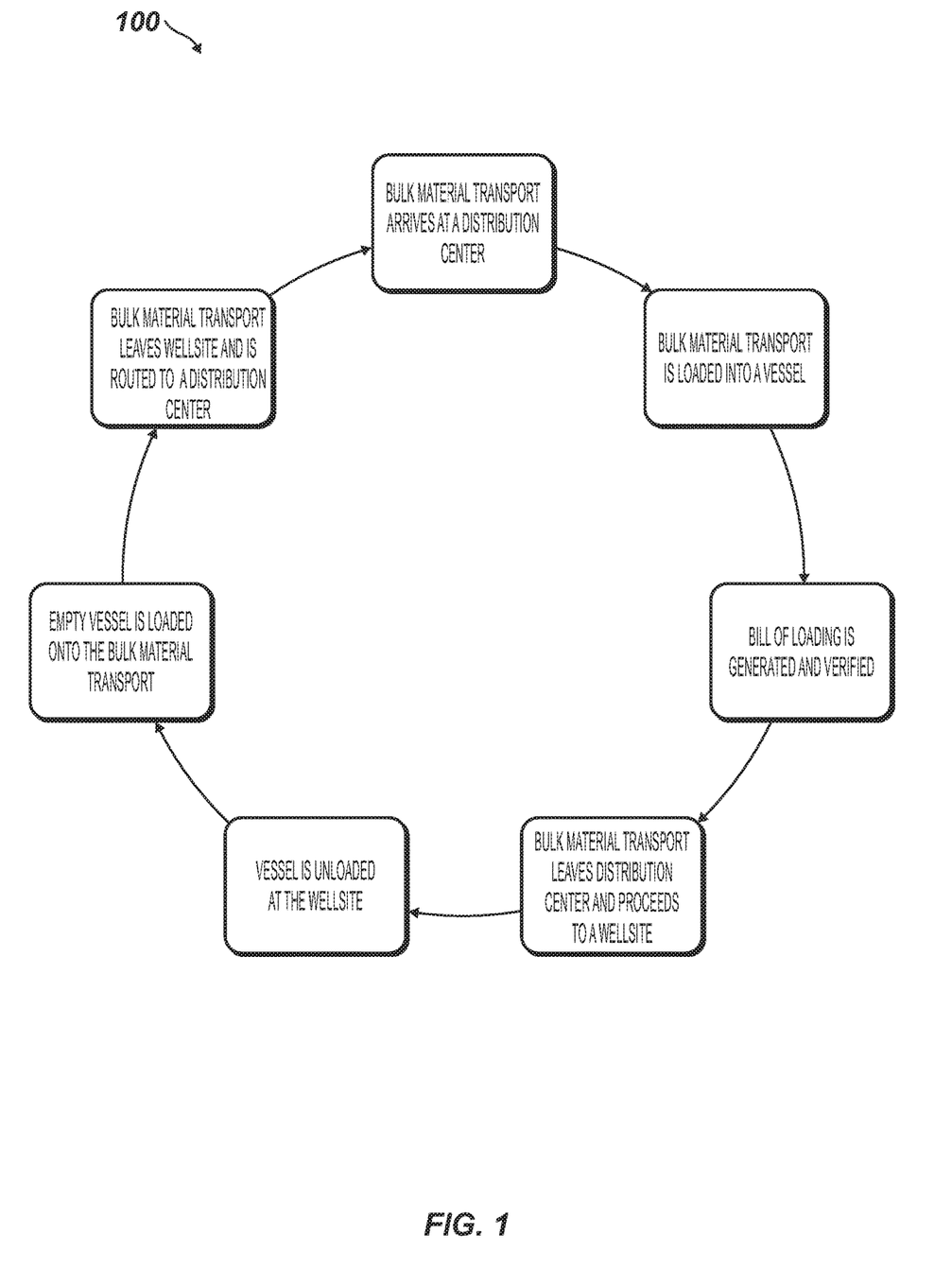
FIG. 1 illustrates an embodiment of a life cycle of bulk material.

FIG. 1 illustrates an embodiment of the life cycle of bulk material 100. First, a bulk material transport may be routed to a distribution center. Once the bulk material transport arrives at the distribution center, a vessel disposed on the bulk material transport may be loaded with the desired type and quantity of bulk material for a given wellsite operation. Once the bulk material has been loaded into the vessel, a bill of lading may then be generated. In an embodiment, a bill of lading may include data pertaining to the bulk material including type, size, amount, the like, and/or any combination thereof. In an embodiment, the bill of lading may be verified utilizing the sensor system and machine learning algorithm at the off-site network. This may be advantageous, as current methods and systems may not be capable of accurately and efficiently validating the bill of lading. Current methods and systems may comprise several disadvantages for verifying a bill of lading including, but not limited to, requiring a substantial amount of time to manually verify, personnel may not be properly trained to verify a bill of lading thereby providing inaccurate verification, the wrong information may be recorded, personnel may be incorrectly trained to verify a bill of lading thereby providing inaccurate verification, the wrong information may be recorded, information may be omitted, the like, and/or any combinations thereof.

Once the bill of lading has been verified, the bulk material transport may then leave the distribution center. The bulk material transport may then proceed to a wellsite. In an embodiment, the bulk material transport may be rerouted to a different wellsite based on the information collected and processed at an off-site network. This process of rerouting a bulk material transport may be discussed in greater detail below. Once the bulk material transport arrives at the determined wellsite, heavy machinery may be used to remove the loaded vessel from the motor vehicle. In an embodiment, the loaded vessel may then be placed at a location on the wellsite for use. Any suitable heavy machinery may be used. In an embodiment, heavy machinery may include fork lifts, cranes, tractors, loaders, the like, and/or any combinations thereof.

Next, the heavy machinery may load an empty vessel onto the bulk material transport. The bulk material transport may then depart from the wellsite and may be routed to a distribution center. Once the bulk material transport arrives at a distribution center, the cycle may start over.

In an embodiment, once the bulk material transport arrives at a wellsite, a time stamp may be recorded by a sensor. This time stamp may be transmitted to an off-site network that may then start a detention clock. As used herein, detention time may refer to the amount of time lapsed between when bulk material has arrived at a wellsite and when the bulk material has been off-loaded from the bulk material transport. Once the bulk material has been off-loaded, a monetary transaction between the consumer and the provider may be executed at the instruction of an adaptive machine located at the off-site network. In an embodiment, inventory reconciliation may be instructed by the adaptive machine once the bulk material may be off-loaded from the bulk material transport. This may reduce the number of unbilled days. The present disclosure may be advantageous as it may immediately record time stamps which in turn may decrease the amount of time it may take to report the information and provide an invoice to the consumer.

Figure 2:
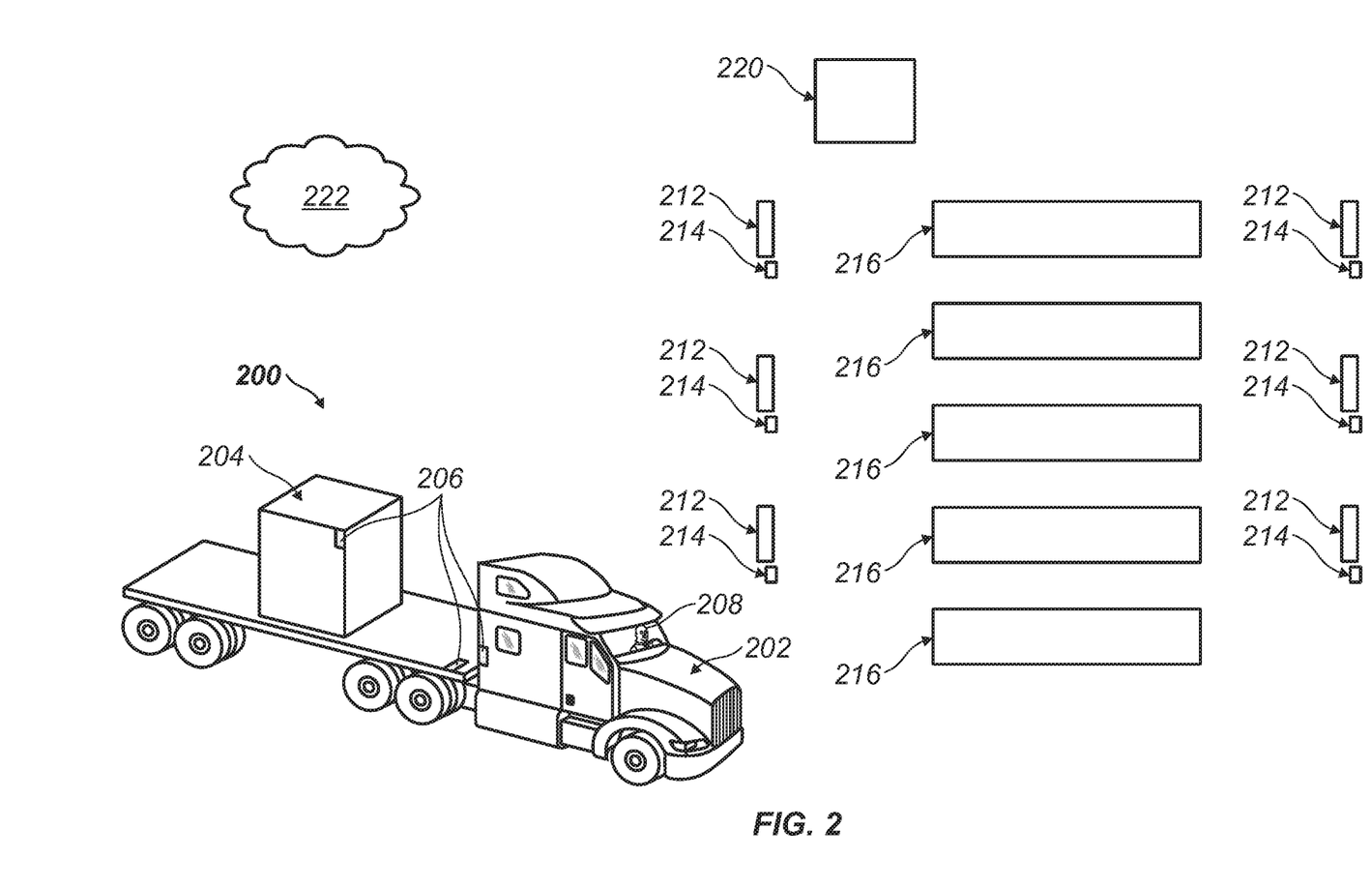
FIG. 2 illustrates an embodiment of a bulk material transport and distribution center.

FIG. 2 illustrates an embodiment of a bulk material transport 200 and bulk material distribution center 210. In an embodiment, a bulk material transport 200 may include, but is not limited to, a motor vehicle 202, a vessel 204, and a sensor 206. Any motor vehicle 202 capable of transporting quantities of bulk material from a distribution center 210 to a wellsite 300 may be used. Suitable motor vehicles 202 may include, but is not limited to, trucks, semi-trucks, rail cars, shipping containers, the like, and/or any combination thereof. In an embodiment, the motor vehicle 202 may be operated by a person 208 also referred to herein as "a driver". In an embodiment, the bulk material transport 200 may comprise a vessel 204. Any suitable vessel 204 capable of receiving, storing, and dispensing bulk material may be used. The vessel 204 may be of any suitable size, shape, thickness, and material and should not be limited herein. In an embodiment, the bulk material transport 200 may comprise a sensor 206. Each sensor 206 may comprise at least one transmitter and one receiver (not shown). In an embodiment, the bulk material transport 200 may comprise a plurality of sensors 206. Sensors 206 may be disposed on any suitable location within the bulk material transport 200. Suitable sensor 206 locations may include, but are not limited to, on the vessel 204, in the motor vehicle 202, outside of the motor vehicle 202, on the chassis of motor vehicle 202, the like, and/or any combination thereof. Any suitable sensor 206 capable of measuring a desired parameter, transmitting the measured parameter to an off-site network 308 where the data may be further analyzed, may be used. In an embodiment, the sensor 206 may be any transmitter/receiver system capable of wirelessly transmitting data from the bulk material transport 200 to an off-site network 222. Suitable sensors 206 may include, but are not limited to, GPS sensor, Bluetooth Low Energy (BLE), Network Gateways, Anchor Points, Access Points, Radio-Frequency Identification (Active and/or Passive), Image Sensor, Load Cells, the like, and/or any combinations thereof. Sensor 206 may be used to measure data at a wellsite and/or at any point during the life cycle of a bulk material.

The data and information stored, collected, and processed at off-site network 222 may be used to route bulk material transport 200 to a distribution center 210. As used herein, a distribution center 210 may refer to any location in which a bulk material may be provided for distribution/redistribution and use to consumers. In an embodiment, distribution center 210 may be located at a mine site where the bulk material may be produced. Upon arrival at the distribution center 210, bulk material transport 200 may pass through an entry point 212. In an embodiment, distribution center 210 may comprise a plurality of entry points 212 and should not be limited herein. Entry point 212 as used herein may also be referred to as a gate, a lane, and/or the like. A sensor 206 may time stamp said arrival and transmit the data to an off-site network 222. This step may also include utilization of location data and image data to validate information collected by sensor.

The bulk material transport 200 may then be directed to a unit 216. In an embodiment, unit 216 may be capable of storing and dispensing bulk material. The bulk material transport 200 may then be positioned such that vessel 204 may be capable of receiving bulk material from unit 216. The bulk material may then be loaded into the vessel 204. In an embodiment, the bulk material may be loaded into vessel 204 by any suitable means. Once loaded, a bill of lading may be produced and given to a driver of the motor vehicle 202. In an embodiment, a bill of lading may include data pertaining to the bulk material including composition, size, amount, the like, and/or any combination thereof. In an embodiment, the bill of lading may be verified utilizing the sensor 206 system and machine learning algorithm at the off-site network. Proper validation may be advantageous as it may ensure that the correct material may be delivered and used to a given wellsite, delivery and use of an incorrect material may result in failure of an operation which may cause a large time delays and/or may damage the wellbore. In an embodiment, the motor vehicle 202 and/or the vessel 204 may comprise a sensor 206 system that may produce an image or a sequence of images and transmit said produced image or sequence of images to an off-site network 108. The off-site network 108 may comprise an machine learning algorithm system that may be trained to determine the type of bulk material loaded into the vessel 204 and/or the amount of bulk material loaded into the vessel 204. In an embodiment, once the vessel 204 has been filled with the desired quantity of bulk material, the driver 208 then departs from the distribution center. The motor vehicle may then pass through a gate as the vehicle leaves the distribution center 210.

Next, bulk material transport 200 may then proceed through an exit point 218 thereby leaving distribution center 210. In an embodiment, distribution center 210 may comprise a plurality of exit points 218 and should not be limited herein. Exit point 218 as used herein may also be referred to as a gate, a lane, and/or the like. A sensor 206 may time stamp said departure and transmit the data to an off-site network 108 for storage and processing. In an embodiment, the measured time stamps may allow for the tracking of delays located at each filling station.

Figure 3:
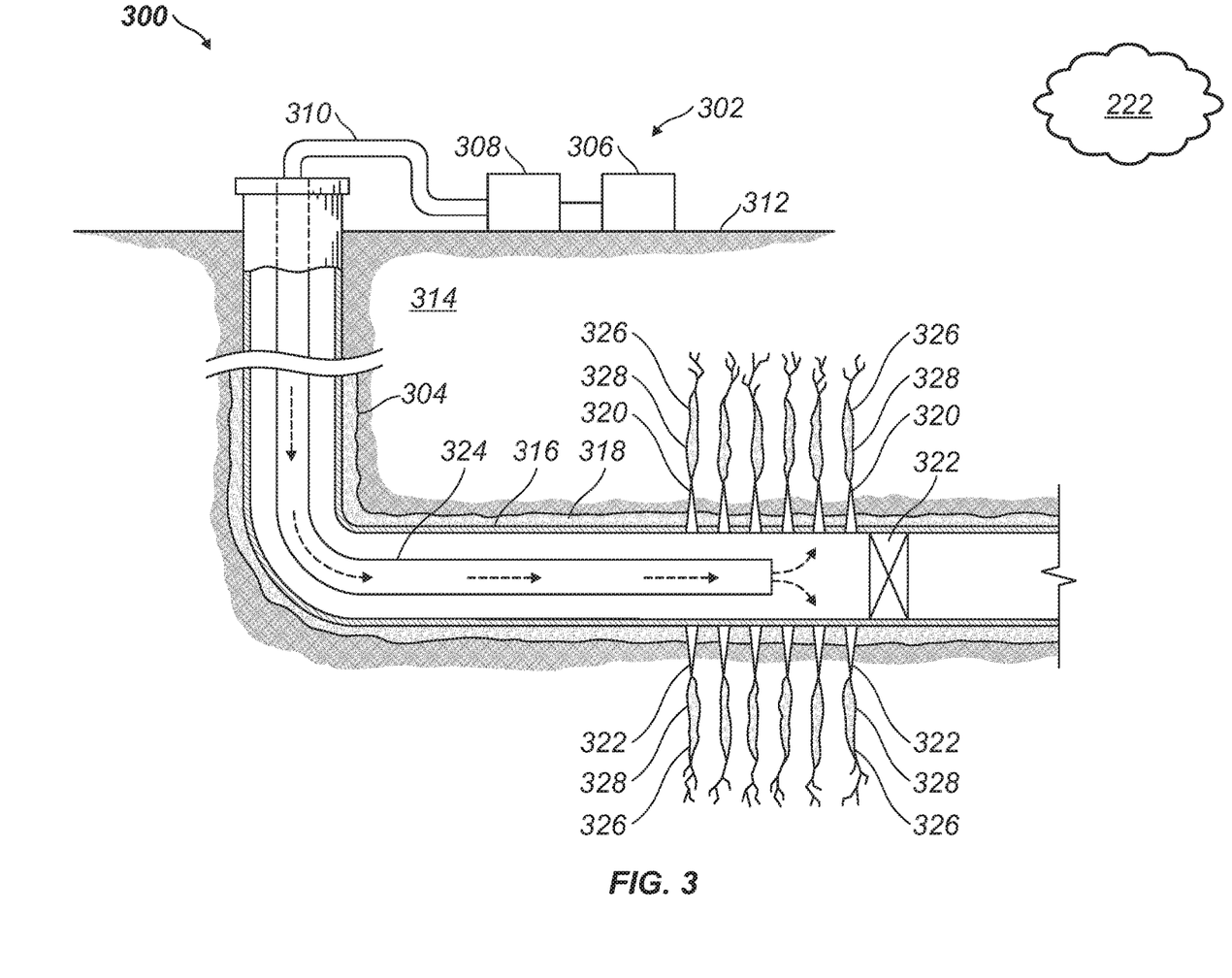
FIG. 3 illustrates an embodiment of a wellbore assembly.

The bulk material transport may then proceed to a wellsite 306 (referring to FIG. 3). In an embodiment, measurements and data may be collected throughout the bulk material life cycle 100. In an embodiment, the measurements and data may be collected, measured and recorded in real-time. These measurements and data may be combined with other measurements and data collected and recorded at other sources. Sources for additional measurements and data may include, but are not limited to, wellsites, traffic data, weather, motor vehicle information, the like, and/or any combination thereof. The data and measurements may be processed and an optimal destination and route may be determined. The bulk material transport 200 may be rerouted to a different wellsite based on the determined output. In an embodiment, optimizing bulk material on each wellsite across multiple wellsites within a given geographical area. In an embodiment, optimization of bulk material at each wellsite may include, minimizing the travel time of a bulk material from a distribution center to a wellsite. In an embodiment, optimization of bulk material at each wellsite may include, minimizing the amount of time a wellsite may be down due to an insufficient amount of bulk material to perform an operation. In an embodiment, the bulk material transport 200 may be rerouted to a different wellsite. The driver 208 may be notified of the route change in any suitable manner, including but not limited to, computers, desktops, laptops, tablets, hand held electronic devices, a navigation system, the like, and/or any combinations thereof.

As noted above, additional data and/or measurements from a wellsite 300 or a plurality of wellsites 300 may be transmitted, stored, and processed by off-site network 222. The additional data and/or measurements may be used to aid in determining the optimal route for a bulk material transport 200. FIG. 3 illustrates an example wellsite 300 that may be used for preparation and delivery of a treatment fluid downhole. It should be noted that while FIG. 3 generally depicts a land-based operation, those skilled in the art will readily recognize that the principles described herein are equally applicable to subsea operations that employ floating or sea-based platforms and rigs, without departing from the scope of the disclosure.

Referring now to FIG. 3, a fluid handling system 302 is illustrated. The fluid handling system 302 may be used for preparation of a treatment fluid including the multi-functional diverter particulate and for introduction of the treatment fluid into a wellbore 304. The fluid handling system 302 may include mobile vehicles, immobile installations, skids, hoses, tubes, fluid tanks or reservoirs, pumps, valves, and/or other suitable structures and equipment. As illustrated, the fluid handling system 302 may include a fluid supply vessel 306, pumping equipment 308, and wellbore supply conduit 310. While not illustrated, the fluid supply vessel 306 may contain one or more components of the treatment fluid (bulk material, the like, and/or any combinations thereof) in separate tanks or other containers that may be mixed at any desired time. Sensor may be located on tanks or other containers and may control the amount of bulk material mixed, the rate at which it may be mixed, the like, and/or any combination thereof. Pumping equipment 308 may be fluidically coupled with the fluid supply vessel 306 and wellbore supply conduit 310 to communicate the treatment fluid into wellbore 304. Fluid handling system 302 may also include surface and downhole sensors (not shown) to measure pressure, rate, temperature and/or other parameters of treatment. Fluid handling system 302 may also include pump controls and/or other types of controls for starting, stopping, and/or otherwise controlling pumping as well as controls for selecting and/or otherwise controlling fluids pumped during the injection treatment. An injection control system may communicate with such equipment to monitor and control the injection of the treatment fluid. As depicted in FIG. 3, the fluid supply vessel 306 and pumping equipment 308 may be above the surface 312 while the wellbore 304 is below the surface 312. As will be appreciated by those of ordinary skill in the art, wellsite 300 may be configured as shown in FIG. 3 or in a different manner, and may include additional or different features as appropriate. By way of example, fluid handling system 302 may be deployed via skid equipment, marine vessel, or may be included of sub-sea deployed equipment.

Wellsite 300 may be used for introduction of any suitable treatment fluid into wellbore 304 and should not be limited herein. Generally, wellbore 304 may include horizontal, vertical, slanted, curved, and other types of wellbore geometries and orientations. Without limitation, the treatment fluid may be applied through the wellbore 304 to subterranean formation 314 surrounding any portion of wellbore 304. As illustrated, the wellbore 304 may include a casing 316 that may be cemented (or otherwise secured) to wellbore wall by cement sheath 318. Perforations 320 allow the treatment fluid and/or other materials to flow into and out of the subterranean formation 314. A plug 322, which may be any type of plug (e.g., bridge plug, etc.) may be disposed in wellbore 304 below the perforations 320 if desired. While FIG. 3 illustrates use of treatment fluid in a cased section of wellbore 304, it should be understood that treatment fluid may also be used in portions of wellbore 304 that are not cased.

The treatment fluid including bulk material may be pumped from fluid handling system 302 down the interior of casing 316 in wellbore 304. As illustrated, well conduit 324 (e.g., coiled tubing, drill pipe, etc.) may be disposed in casing 316 through which the treatment fluid may be pumped. The well conduit 324 may be the same or different than the wellbore supply conduit 310. For example, the well conduit 324 may be an extension of the wellbore supply conduit 310 into the wellbore 304 or may be tubing or other conduit that is coupled to the wellbore supply conduit 310. The treatment fluid may be allowed to flow down the interior of well conduit 324, exit the well conduit 324, and finally enter subterranean formation 314 surrounding wellbore 304 by way of perforations 320 through the casing 316 (if the wellbore is cased as in FIG. 3) and cement sheath 318. Without limitation, the treatment fluid may be introduced into subterranean formation 314 whereby one or more fractures 326 may be created or enhanced in subterranean formation 314. For example, the treatment fluid may be introduced into subterranean formation 314 at or above a fracturing pressure. As previously, described, the treatment fluid including the bulk material may be placed into the subterranean formation 314 after a previous treatment has been performed such that additional locations in the subterranean formation 314 may be treated. Without limitation, at least a portion of the bulk materials may be deposited in the subterranean formation 314.

As previously described, a variety of treatments may be performed using the bulk material. Suitable subterranean treatments may include, but are not limited to, drilling operations, production stimulation operations (e.g., fracturing, acidizing), and well completion operations (e.g., gravel packing or cementing). These treatments may generally be applied to the subterranean formation 314.

The well treatment may include a fracturing treatment in which one or more fractures 326 may be created in subterranean formation 314. Fracture 326 is shown extending from wellbore 304. The fracturing of the subterranean formation 314 may be accomplished using any suitable technique. By way of example, a fracturing treatment may include introducing a fracturing fluid into subterranean formation 314 at or above a fracturing pressure. The fracturing fluid may be introduced by pumping the fracturing fluid through casing 316, perforations 320, and into subterranean formation 314 surrounding wellbore 304. Alternatively, a jetting tool (not shown) may be used to initiate the fracture 326. The fracturing fluid may include proppant particulates which may be deposited on the fracture 326 to form a proppant pack 328. A sensors or a plurality of sensors (not shown) may be disposed throughout wellsite 300. In an embodiment, sensors may be disposed on a blender, fluid handling system, downhole, a wellhead, a flow line leading to the well, a flow line leading from the well, the like, and/or any combinations thereof. Sensors may be disposed at any suitable location on wellsite 300 and should not be limited herein. Any suitable sensor capable of measuring a desired parameter, transmitting the measured parameter to an off-site network 222 where the data may be further analyzed, may be used. In an embodiment, the sensor may be any transmitter/receiver system capable of wirelessly transmitting data from wellsite 300 to an off-site network 222. Suitable sensors may include, but are not limited to, GPS sensor, Bluetooth Low Energy (BLE), Network Gateways, Anchor Points, Access Points, Radio-Frequency Identification (Active and/or Passive), Image Sensor, Load Cells, the like, and/or any combinations thereof.

Figure 4:
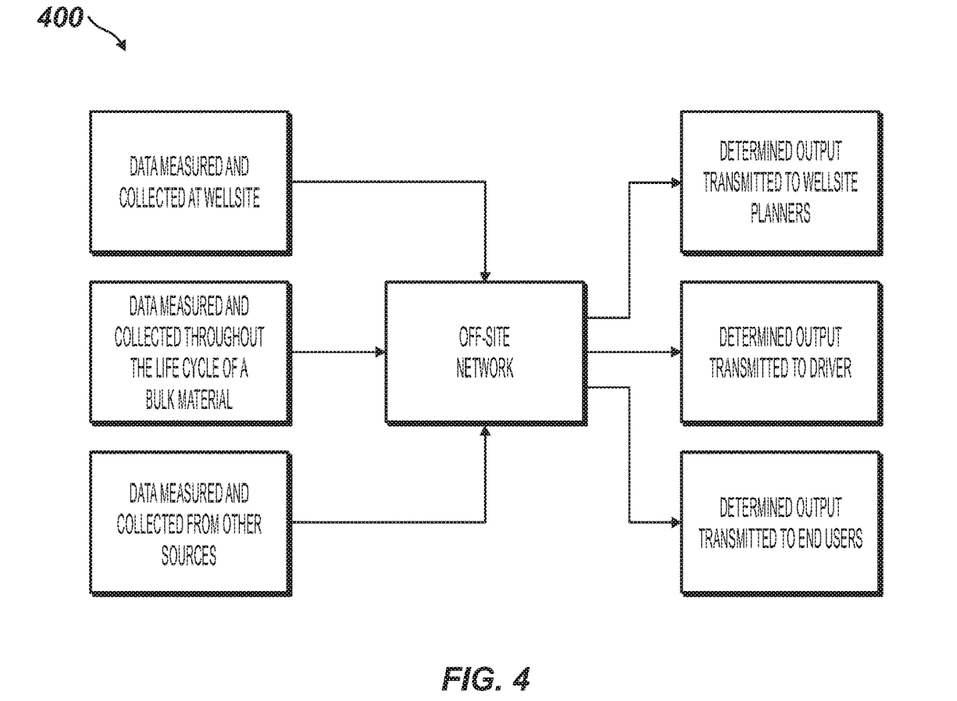
FIG. 4 illustrates a flow diagram depicting an example method for determining an optimal route for redistributing bulk material across a defined geographical area.

FIG. 4 illustrates a flow diagram depicting an example method for determining an optimal route for redistributing bulk material across a defined geographical area 400. In an embodiment, data may be measured and collected at a wellsite. Any suitable data may be measured and collected, including but not limited to, bulk material consumption, type of operation to be performed, type of bulk material required for desired operation, amount of bulk material required for desired operation, . . . , the like, and/or any combination thereof [any others?] Optionally, data may be measured and collected throughout the life cycle of a bulk material 300 (referring to FIG. 3). Any suitable data may be measured and collected, including but not limited to, time stamps upon arrival and departure, type of bulk material being loaded, amount of bulk material being loaded, well disruptions, well equipment failure, the minimum amount of material required for a given wellsite, the maximum amount of material required for a given wellsite, excess amount of bulk material at a wellsite at a given time, the like, and/or any combination thereof. Optionally, data may be measured and collected from additional sources. Such data may include, but is not limited to, weather, traffic conditions, vehicle conditions, road conditions, wellsite conditions, wellbore conditions, the like, and/or any combination thereof. In an embodiment, data may be measured and collected at a wellsite, a plurality of wellsites, throughout the life cycle of bulk material, and from additional sources, and/or any combination thereof. The measured data may then be transmitted to off-site network 108 for storage and processing. Based on the output of the processed data, an optimal wellsite location and route to said wellsite location may be determined. This information may then be transmitted to driver 208. Driver 208 may then reroute bulk material transport to the newly identified wellsite location. In an embodiment, the determined information may be transmitted to any end user including, but not limited to, wellsite planners, load planners, drivers, the like, and/or any combinations thereof.

Figure 5:
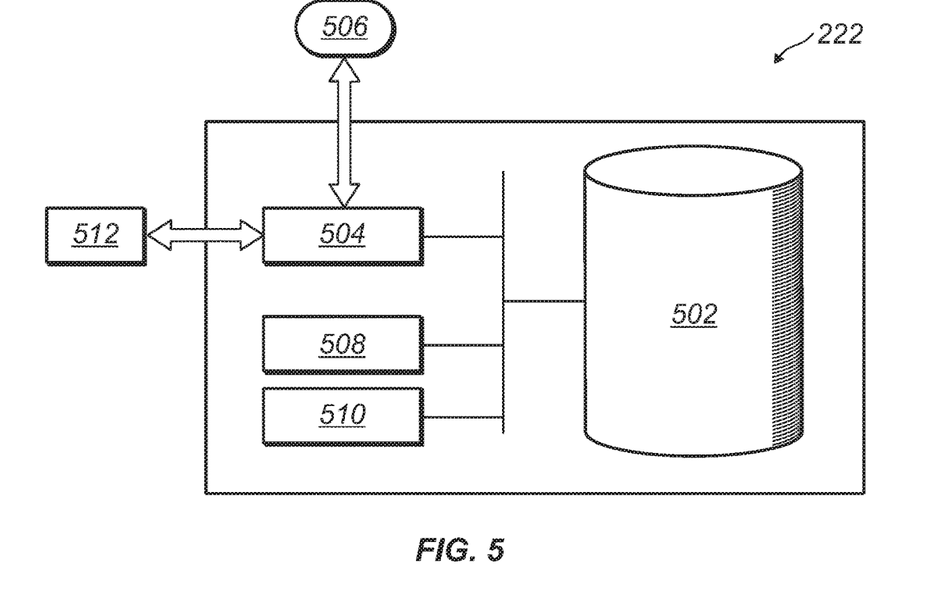
FIG. 5 illustrates an embodiment of an off-site network.

Data and/or measurements may be collected at any point throughout the life cycle of bulk material. The collected data and/or measurements may be transmitted to off-site network 222 for further processing and/or storage. off-site network 222 may process the collected data in any suitable manner for determining the optimal location and route for a given load of bulk material. In an embodiment, the processor may determine if the bulk material located at the wellsite is sufficient for completing the current stage. FIG. 5 illustrates an embodiment of off-site network 222. Off-site network 222 may comprise any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. In certain embodiments, an off-site network 222 may comprise hardware for executing instructions, such as those making up a computer program. In certain embodiments, a off-site network 222 may be coupled to a memory device 502 where data, software, programming, and/or executable instructions are stored. Such memory devices may comprise a hard drive, random access memory (RAM), read-only memory (ROM), or other similar storage media known in the art, and may comprise a set of instructions that when executed by the off-site network 222 may cause the off-site network 222 to perform one or more of the actions, calculations, or steps of the methods of the present disclosure described herein. In certain embodiments, a computer processor may comprise one or more arithmetic logic units (ALUs); be a multi-core processor; or comprise one or more processors.

In an embodiment, the off-site network 222 may execute instructions, for example, to generate output data 504 based on data inputs 504. For example, the off-site network 222 may include a processor 508 that may execute or interpret software, scripts, programs, functions, executables, or other modules. In certain embodiments, input data received by the off-site network 222 may comprise data from one or more sensors sensing one or more signals from a detectable component of the MOF of the present disclosure. In certain embodiments, output data generated by the off-site network 222 may comprise imaging data and/or images that may be processed by an optical computing device. Images may be used as a "sensor" in this process. Image data may be utilized by deep learning algorithm to provide precise results that may be difficult to achieve otherwise. In an embodiment, the adaptive machine may be capable: of validating a bill of lading as described above.

The off-site network 222 may communicate by any type of communication channel, connector, data communication network, or other link 506. In certain embodiments, for example, the communication may comprise a wireless or a wired network, a Local Area Network (LAN), a Wide Area Network (WAN), a private network, a public network (such as the Internet), a WiFi network, a network that comprises a satellite link, a serial link, a wireless link (e.g., infrared, radio frequency, or others), a parallel link, another type of data communication network, or any combination thereof.

In an embodiment, off-site network 222 may use a computer algorithm to estimate the redistribution of bulk material across a defined geographical area. The defined geographical area may comprise at least one wellsite. In an embodiment, the defined geographical area may comprise a plurality of wellsites. The algorithm may be part of an adaptive machine configured to use the amount of bulk material required for a process, the amount of bulk material located at a wellsite, the consumption rate of bulk material at a wellsite, the time required to deliver bulk material to a wellsite, to estimate the redistribution of bulk material across a defined geographical area. The adaptive machine may comprise "artificial intelligence" that may utilize algorithms to learn via inductive inference based on observing data that represents incomplete information about statistical phenomenon and generalize it to rules and make predictions on missing attributes or future data. Further, the adaptive machine may perform pattern recognition, in which the adaptive machine may "learn" to automatically recognize complex patterns, to distinguish between exemplars based on their different patterns, and to make intelligent predictions on their class. In an embodiment, the adaptive machine may utilize a machine learning algorithm that may be trained using samples of predetermined characteristics of interest, and thereby generating a virtual library. As the virtual library available to the machine learning algorithm becomes larger, the machine learning algorithm may become more capable of accurately predicting the redistribution of bulk material. Furthermore, with sufficient training, the machine learning algorithm may more accurately predict the optimal redistribution of bulk material across a defined geographical area, even in the presence of unknown analytes.

In some embodiments, data and/or measurements collected using the optical computing device may be archived along with data associated with operational parameters being logged at a job site and within the life cycle of bulk material. In addition, the data and information may be communicated (wired or wirelessly) to a remote location by a communication system (e.g., satellite communication or wide area network communication) for further analysis. Automated control with a long-range communication system may further facilitate the optimization of distributed bulk material across a defined geographical area.

In an embodiment, adaptive machine 510 may facilitate the rerouting of bulk material transport. Adaptive machine 510 may process a wide variety of variables and possible outcomes so that an optimal route for bulk material transport may be produced. In an embodiment, adaptive machine 510 may collect the demand of bulk material required for a wellsite or a plurality of wellsites. Adaptive machine 510 may then rank the demand of bulk material. The demand of bulk material may be ranked based on the total cost of ownership and the time it may take to deliver the bulk material. Once the demand has been ranked, the adaptive machine 510 may then allocate the demand of bulk material utilizing a transportation management system based on the determined rank. The transportation management system may also be analyzed by the adaptive machine 510. In an embodiment, the transportation management system may comprise a plurality of bulk material transports. The analysis may comprise determining which bulk material transports have already been assigned loads, how long the bulk material transports may have been at the distribution center, how long it may take the bulk material transports to deliver the bulk material to a wellsite. The adaptive machine 510 may also provide a visual map of each load of bulk material and its current location. Optionally, adaptive machine 510 may determine the minimum and maximum bulk material requirement for a wellsite based on a number of factors. Factors may include, but are not limited to, location of the distribution center, location of the wellsite, routes from the distribution center to the wellsite, traffic, weather, planned consumption rate of bulk material at the well site, amount of bulk material currently at the wellsite, the like, and/or any combinations thereof. Processing collected data using the adaptive machine 510 as noted above may be advantageous as it may accurately predict which bulk material transports may service a wellsite in real-time. This is merely an example of the processing an adaptive machine 510 may use to optimize the redistribution of bulk material across a defined geographical area and should not limited the present disclosure herein.

Adaptive machine 510 may then output the determined optimal route to a display device. Any suitable display device may be used and should not be limited herein. Suitable display devices may include, computers, desktops, laptops, tablets, hand held electronic devices, a navigation system, the like, and/or any combinations thereof.

Accordingly, this disclosure describes methods, systems, and apparatuses that may use the disclosed screws. The methods, systems, and apparatuses may include any of the following statements:

Statement 1. A method for providing bulk material for a wellbore operation, the method comprising: forming a logistical model database to determine the bulk material required for an at least one wellsite located in a geographical area; acquiring the bulk material from a distribution center; verifying the bulk material acquired; and transporting the bulk material for the wellbore operation.

Statement 2. The method of statement 1, wherein transporting the bulk material further comprises: selecting a first wellsite within the geographical area; determining a first route to transport the bulk material required to the first wellsite; analyzing the bulk material required for a second wellsite within the geographical area, wherein the bulk material required for the first wellsite is the same as the bulk material required for the second wellsite; determining a second route to transport the bulk material required to the second wellsite; comparing the first route and the second route; determining an optimal route for the bulk material required; and transporting the bulk material required to the first wellsite or the second wellsite via the optimal route.

Statement 3. The method of statement 1 or 2, wherein the first route, the second route, and the optimal route are determined using an off-site network comprising an adaptive machine.

Statement 4. The method of any of the preceding statements, wherein the optimal route is transmitted from the off-site network to a display device thereby notifying a bulk material transport operator.

Statement 5. The method of any of the preceding statements, wherein comparing the first route and the second route further comprises comparing at least one parameter selected from the group consisting of location of the distribution center, location of each wellsite, routes from the distribution center to each wellsite, traffic patterns, weather, planned consumption rate of the bulk material at each wellsite, amount of bulk material currently at each wellsite, a maximum amount of bulk material required at each wellsite, minimum amount of bulk material required at each wellsite, and any combinations thereof.

Statement 6. The method of any of the preceding statements, wherein the optimal route minimizes the transportation time of the bulk material from the distribution center to the first wellsite or from the distribution center to the second wellsite.

Statement 7. The method of any of the preceding statements, wherein acquiring the bulk material further comprises: providing a bulk material transport comprising a vessel capable of holding the bulk material; operating the bulk material transport to enter a bulk material distribution center; and loading the bulk material into the vessel.

Statement 8. The method of any of the preceding statements, wherein verifying the bulk material further comprises: collecting data at the distribution center via an at least one sensor located on a bulk material transport; transmitting the collected data to an off-site network comprising an adaptive machine; analyzing the collected data to determine the bulk material acquired; and comparing the acquired bulk material with the required bulk material.

Statement 9. The method of any of the preceding statements, wherein the adaptive machine is capable of verifying that the acquired bulk material is the required bulk material.

Statement 10. The method of any of the preceding statements, wherein the collected data comprises at least one parameter selected from the group consisting of a type of bulk material, the bulk material size, an amount of the bulk material, and any combinations thereof.

Statement 11. A method for providing bulk material for a wellbore operation, the method comprising: determining demand for the bulk material across a geographical area; collecting data throughout a life cycle of the bulk material; transmitting the collected data to an off-site network comprising an adaptive machine; analyzing the collected data via the off-site network thereby producing an output; providing the bulk material to a wellsite based on the output.

Statement 12. The method of statement 11, wherein the life cycle of the bulk material comprises: routing a bulk material transport to a distribution center based on the determined demand; loading the bulk material transport with the bulk material; verifying the bulk material loaded into the bulk material transport; selecting a route from the distribution center to a wellsite; transporting the bulk material to the wellsite; and unloading the bulk material at the wellsite.

Statement 13. The method of statement 11 or 12, wherein the route selected minimizes the transportation time of the bulk material.

Statement 14. The method of any of statements 11 to 13, wherein the data collected comprises at least one parameter selected from the group consisting of composition of the bulk material, size of the bulk material, location of the distribution center, location of the wellsite, routes from the distribution center to the wellsite, traffic patterns, weather, planned consumption rate of the bulk material at the wellsite, amount of bulk material currently at the wellsite, and any combinations thereof.

Statement 15. The method of any of statements 11 to 14, wherein the output comprises at least one determined parameter selected from the group consisting of a maximum amount of bulk material required at the wellsite, a minimum amount of bulk material required at the wellsite, a composition of the bulk material, size of the bulk material, amount of the bulk material, and any combinations thereof.

Statement 16. A system, the system comprising: a bulk material transport capable of moving bulk material from one location to another location; an off-site network comprising an adaptive machine; and a sensor coupled to the bulk material transport capable of collecting data and transmitting data to the off-site network.

Statement 17. The system of statement 16, wherein the collected data is wirelessly transmitted from the sensor to the off-site network.

Statement 18. The system of statement 16 or 17, wherein the off-site network comprises an algorithm capable of determining the demand of a bulk material across a geographical area.

Statement 19. The system of any of the preceding statements, wherein the algorithm is a machine learning algorithm.

Statement 20. The system of any of the preceding statements, further comprising a plurality of sensors coupled to the bulk material transport capable of collecting data measured at a wellsite, during a life cycle of a bulk material, from an additional source, wherein the additional source provides at least one data point selected from the group consisting of traffic data, weather data, motor vehicle data, road conditions, and any combinations thereof.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular examples disclosed above are illustrative only, as the present disclosure may be modified and practiced in different but equivalent manners apparent to those skilled in the art having the benefit of the teachings herein. Although individual examples are discussed, the disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method for providing bulk material for a wellbore operation, the method comprising:
    forming a logistical model database to determine the bulk material required for an at least one wellsite located in a geographical area;
    acquiring the bulk material from a distribution center;

capturing images of the bulk material with an image sensor to verify the bulk material acquired;
transporting the bulk material for the wellbore operation by:
selecting a first wellsite within the determined geographical area;
determining a first route to transport the bulk material required to the first wellsite;
analyzing the bulk material required for a second wellsite within the geographical area, wherein the bulk material required for the first wellsite is the same as the bulk material required for the second wellsite;
determining a second route to transport the bulk material required to the second wellsite;
comparing the first route and the second route;
determining an optimal route for the bulk material required; and
transporting the bulk material required to the first wellsite or the second wellsite via the optimal route;
wherein the first route, the second route, and the optimal route are determined using an off-site network comprising an adaptive machine; wherein the adaptive machine utilizes an algorithm to learn via inductive inference and perform pattern recognition; wherein the algorithm is configured to determine the amount of the bulk material required for a process, the amount of the bulk material located at the first or second wellsite, the consumption rate of the bulk material at the first or second wellsite, the time required to deliver bulk material to the first or second wellsite, or to estimate the redistribution of bulk material across the defined geographical area;
tracking the position of the bulk material with a GPS sensor as it is transported; and
tracking the proximity of the bulk material to the first or second wellsite with a Bluetooth low-energy sensor.

2. The method of claim 1, wherein the optimal route is transmitted from the off-site network to a display device thereby notifying a bulk material transport operator.

3. The method of claim 1, wherein comparing the first route and the second route further comprises comparing at least one parameter selected from the group consisting of location of the distribution center, location of each wellsite, routes from the distribution center to each wellsite, traffic patterns, weather, planned consumption rate of the bulk material at each wellsite, amount of bulk material currently at each wellsite, a maximum amount of bulk material required at each wellsite, minimum amount of bulk material required at each wellsite, and any combinations thereof.

4. The method of claim 1, wherein the optimal route minimizes the transportation time of the bulk material from the distribution center to the first wellsite or from the distribution center to the second wellsite.

5. The method of claim 1, wherein acquiring the bulk material further comprises:
providing a bulk material transport comprising a vessel capable of holding the bulk material;
operating the bulk material transport to enter a bulk material distribution center; and
loading the bulk material into the vessel.

6. The method of claim 1, wherein capturing images of the bulk material with an image sensor to verify the bulk material further comprises:
collecting data at the distribution center via the at least one image sensor located on a bulk material transport;
transmitting the collected data to an off-site network comprising the adaptive machine;
analyzing the collected data to determine the bulk material acquired; and
comparing the acquired bulk material with the required bulk material.

7. The method of claim 6, wherein the adaptive machine is capable of verifying that the acquired bulk material is the required bulk material.

8. The method of claim 6, wherein the collected data comprises at least one parameter selected from the group consisting of a type of bulk material, the bulk material size, an amount of the bulk material, and any combinations thereof.

9. The method of claim 1, wherein the adaptive machine additionally ranks the demand of bulk material based on the total cost of ownership and the time it may take to deliver the bulk material.

10. The method of claim 9, wherein the adaptive machine allocates the demand of bulk material utilizing a transportation management system based on the determined rank.

11. The method of claim 1, wherein the adaptive machine provides a visual map of each load of bulk material and its current location.

12. A method for providing bulk material for a wellbore operation, the method comprising:
determining demand for the bulk material across a geographical area;
collecting data throughout a life cycle of the bulk material;
transmitting the collected data to an off-site network comprising an adaptive machine;
wherein the adaptive machine utilizes an algorithm to learn via inductive inference and perform pattern recognition; wherein the algorithm is configured to determine the amount of the bulk material required for a process, the amount of the bulk material located at a wellsite, the consumption rate of the bulk material at a wellsite, the time required to deliver the bulk material to a wellsite, or to estimate the redistribution of the bulk material across the defined geographical area;
analyzing the collected data via the off-site network with the adaptive machine thereby producing an output;
acquiring the bulk material from a distribution center;
capturing images of the bulk material with an image sensor to verify the bulk material acquired;
transporting the bulk material for the wellbore operation by selecting a wellsite within the determined geographical area;
determining an optimal route to transport the bulk material required to the wellsite;
tracking the position of the bulk material with a GPS sensor as it is transported;
tracking the proximity of the bulk material to the wellsite with a Bluetooth low-energy sensor; and
providing the bulk material to the wellsite based on the output.

13. The method of claim 12, wherein the life cycle of the bulk material comprises:
routing a bulk material transport to a distribution center based on the determined demand;
loading the bulk material transport with the bulk material;
verifying the bulk material loaded into the bulk material transport with the image sensor;
selecting a route from the distribution center to the wellsite; and
unloading the bulk material at the wellsite.

14. The method of claim 13, wherein the route selected minimizes the transportation time of the bulk material.

15. The method of claim 12, wherein the data collected comprises at least one parameter selected from the group consisting of composition of the bulk material, size of the bulk material, location of the distribution center, location of the wellsite, routes from the distribution center to the wellsite, traffic patterns, weather, planned consumption rate of the bulk material at the wellsite, amount of bulk material currently at the wellsite, and any combinations thereof.

16. The method of claim 12, wherein the output comprises at least one determined parameter selected from the group consisting of a maximum amount of bulk material required at the wellsite, a minimum amount of bulk material required at the wellsite, a composition of the bulk material, size of the bulk material, amount of the bulk material, and any combinations thereof.

17. A system, the system comprising:
a bulk material transport capable of moving bulk material from one location to another location;
an off-site network comprising an adaptive machine; wherein the adaptive machine utilizes an algorithm to learn via inductive inference and perform pattern recognition; wherein the algorithm is configured to determine the amount of bulk material required for a process, the amount of bulk material located at a wellsite, the consumption rate of bulk material at a wellsite, the time required to deliver bulk material to a wellsite, or to estimate the redistribution of bulk material across a defined geographical area;
an image sensor coupled to the bulk material transport capable of collecting data and transmitting data to the off-site network;
a GPS sensor configured to track the bulk material as it is transported;
a Bluetooth low-energy sensor to track the proximity of the bulk material to a target location.

18. The system of claim 17, wherein the collected data is wirelessly transmitted from the sensor to the off-site network.

19. The system of claim 17, wherein the algorithm is additionally capable of determining the demand of a bulk material across a geographical area.

20. The system of claim 17, further comprising a plurality of sensors coupled to the bulk material transport capable of collecting data measured at a wellsite, during a life cycle of a bulk material, from an additional source, wherein the additional source provides at least one data point selected from the group consisting of traffic data, weather data, motor vehicle data, road conditions, and any combinations thereof.

* * * * *